(12) United States Patent
Morita et al.

(10) Patent No.: US 7,150,841 B2
(45) Date of Patent: Dec. 19, 2006

(54) INJECTION MOLDING MACHINE AND METHOD OF CONTROLLING THE INJECTION MOLDING MACHINE

(75) Inventors: Ryozo Morita, Nagoya (JP); Satoshi Tomita, Ohbu (JP); Tsuyoshi Miyaki, Ohbu (JP); Keijiro Oka, Ohbu (JP); Tokuzou Sekiyama, Kanra-gun (JP); Hiroshi Shibuya, Kanra-gun (JP); Satoshi Nishida, Kanra-gun (JP)

(73) Assignees: Kabushiki Kaisha Meiki Seisakusho, Aichi (JP); Nisso Electric Co., Ltd., Gunma (JP)

( * ) Notice: Subject to any disclaimer, the term of this patent is extended or adjusted under 35 U.S.C. 154(b) by 0 days.

(21) Appl. No.: 11/044,019

(22) Filed: Jan. 28, 2005

(65) Prior Publication Data

US 2005/0127546 A1 Jun. 16, 2005

(51) Int. Cl.
*B29C 45/50* (2006.01)
*B29C 45/76* (2006.01)

(52) U.S. Cl. ............ 264/40.5; 425/145; 425/149; 700/55

(58) Field of Classification Search ........ 264/40.1, 264/40.5, 40.7; 425/145, 149, 574; 700/55
See application file for complete search history.

(56) References Cited

U.S. PATENT DOCUMENTS

| | | | | |
|---|---|---|---|---|
| 5,421,712 A | * | 6/1995 | Laing et al. ............. | 425/145 |
| 5,567,367 A | * | 10/1996 | Ito et al. ............. | 264/40.1 |
| 5,679,384 A | * | 10/1997 | Emoto ................ | 425/145 |
| 6,309,571 B1 | * | 10/2001 | Gao et al. ............ | 264/40.1 |
| 6,340,439 B1 | * | 1/2002 | Hiraoka .............. | 264/40.1 |

FOREIGN PATENT DOCUMENTS

| | | | |
|---|---|---|---|
| EP | 968808 | * | 1/2000 |
| JP | 3-45326 | * | 2/1991 |
| JP | 10-286848 | * | 10/1998 |

* cited by examiner

*Primary Examiner*—Jill L. Heitbrink
(74) *Attorney, Agent, or Firm*—Nath & Associates PLLC; Gregory B. Kang; Teresa M. Arroyo (57) ABSTRACT

An injection molding machine comprises a pre-pressure addition means 2 adding a pre-pressure B acting in the opposite direction of a molding material pressure A received by a screw 1 to a detection means 3 and/or the screw 1, the detection means 3 detecting the axial pressures A and B of the screw, and a screw movement control means 4 controlling the axial pressure based on a different between the pre-pressure B and the molding material pressure A, wherein the pre-pressure addition means 2 is made non-contact with the direction means 3, a forward and backward driving motor 17 is disposed adjacent to a heating cylinder 10, and a screw connector 21 at the rear end of the screw 1 is spline-connected inside a rotating rotor of a screw rotating motor 12. According to the machine, the molding material pressure received by the screw can be accurately detected without being affected by the wear of the machine so as to properly control the axial pressure of the screw and to make the machine compact.

5 Claims, 6 Drawing Sheets

INJECTION MOLDING MACHINE AND METHOD OF CONTROLLING THE INJECTION MOLDING MACHINE

TECHNICAL FIELD

The present invention relates to an injection molding machine and a method of controlling the injection molding machine, and more particularly to an injection molding machine and a method of controlling the injection molding machine having a screw inserted into a heating cylinder so as to be rotated about an axis and moved along an axial direction.

BACKGROUND ART

Figure 1:
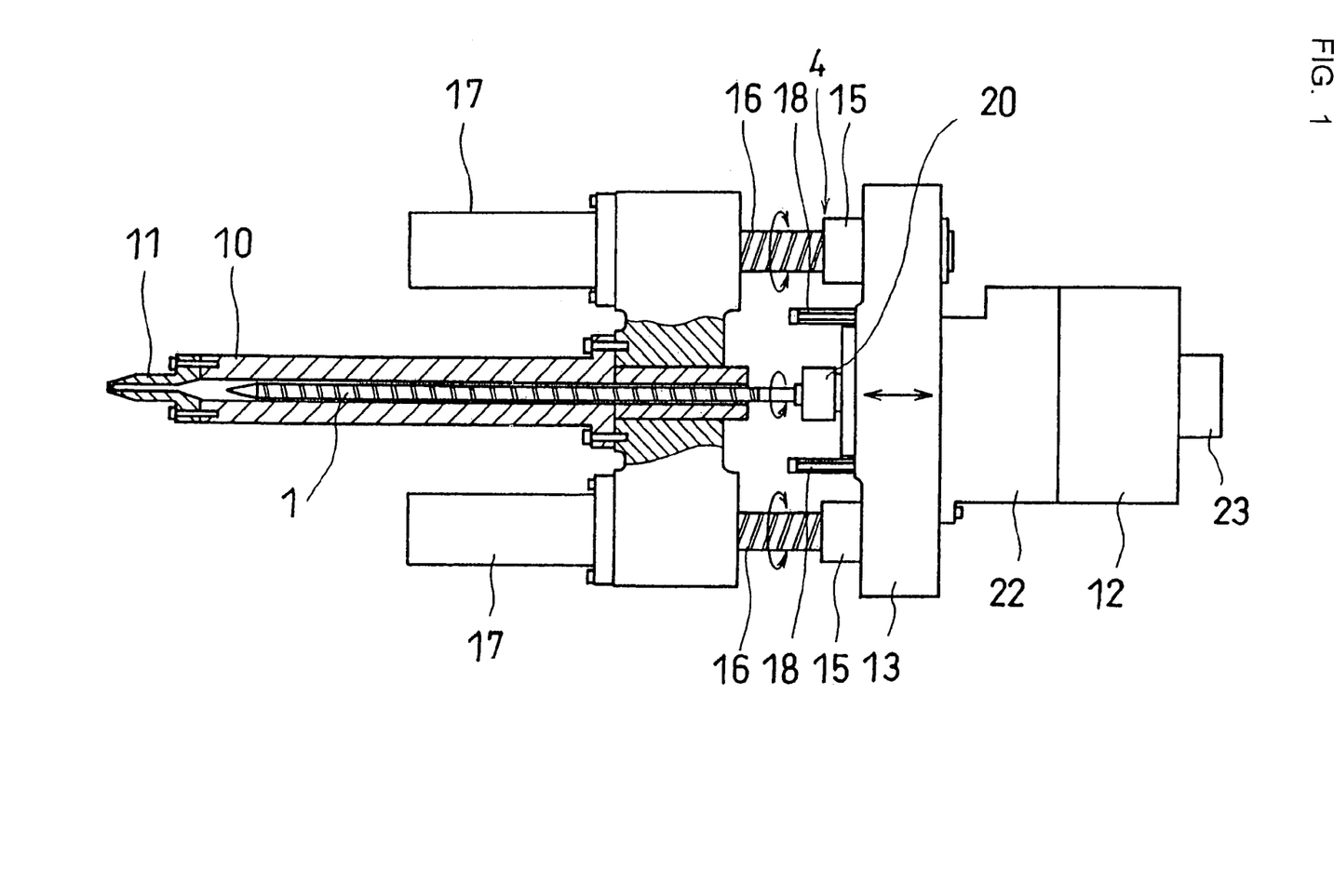
FIG. 1 is a sectional view showing an embodiment of an injection device of an injection molding machine to which the present invention is applied.

Generally, in an injection device of an injection molding machine, a screw rotating motor is connected to the rear end of a screw inserted into a heating cylinder to rotate the screw about an axis in the heating cylinder, as shown in FIG. 1. Then, the screw rotating motor is disposed such that the rotary shaft of the rotating rotor thereof projects forward (not shown) and connected to the screw through a coupling, and the like. Further, the injection device includes a screw moving means (refer to reference numeral 4 of FIG. 1) to movably support the screw axially rearward and forward. A servo motor using a permanent magnet is ordinarily employed as the screw moving means to controllably drive the movement of the screw in an axial direction.

A molding material such as a resin, and the like, which has been fed into the heating cylinder by rotating the screw about the axis by driving the screw rotating motor, is heated, melted, and plasticized while being kneaded for a predetermined period of time, and a predetermined amount of the molding material is stored forward of the heating cylinder (when it is metered). In the metering, a back pressure acting to press the screw axially backward is produced by the reaction for pushing out the molding material forward of the heating cylinder, and the screw supported by the screw moving means is moved axially backward according to the back pressure. The molding material is plasticized for a predetermined period of time by moving the screw axially rearward by a predetermined stroke while properly rotating it, thereby an accurately metering amount of the molding material is stored forward of the heating cylinder.

Thereafter, a nozzle disposed at the extreme end of the heating cylinder is caused to be in nozzle-touch with a sprue of a clamped metal mold by moving the injection device forward, and the screw is moved forward by driving the screw moving means to thereby inject the molding material having been plasticized in the heating cylinder and stored forward thereof in the proper amount from the nozzle with a predetermined pressure (filling pressure) so as to fill the metal mold with the molding material, and thereafter the molding material is held with a predetermined pressure (holding pressure, in injection). The screw is subjected to the reaction (injection pressure) for pushing out the molding material from the nozzle also in the injection when it is moved forward in the heating cylinder by driving the screw moving means. The fill pressure and the holding pressure, that is, the injection pressure received by the screw in the injection, acts axially rearward of the screw, similarly to the back pressure in the metering. The holding pressure is ordinarily set lower than the fill pressure. Note that, when the back pressure is not particularly distinguished from injection pressure in the following description, a force, which acts on the screw so as to push it axially rearward by the reaction of the molding material in the metering and in the injection, is referred to as a molding material pressure.

Japanese Examined Patent Application Publication No. 63-25934 discloses a method of and an apparatus for controlling the back pressure of a screw of an injection device. The screw back pressure control method has such a feature that the rearward movement of a screw that is caused when a molding material is charged by the rotation of the screw is converted into a rotating motion so as to control the rotating force of the screw. Further, the screw back pressure control apparatus disclosed in the publication is composed of an extending shaft connected to the rear end portion of the screw integrally therewith and having a gear for applying a rotating force to the screw with the shaft end thereof rotatably coupled with a screw hold member, the screw hold member disposed to a pair of support shaft disposed in a housing so as to move forward and rearward, a screw shaft for converting the rearward movement of the screw that moves together with the screw hold member into a rotating motion, and a brake unit connecting to the shaft portion of the screw shaft as well as controlling the rotating force of the shaft portion caused by the movement of the screw hold member. That is, an object of the technology disclosed in the publication for converting the rearward movement of the screw, which is caused following to the charge of a molding material charged by the rotation of the screw about an axis, into a rotating motion and for controlling the running torque of the rotating motion is to provide a method of and an apparatus capable of controlling a screw back pressure without using a hydraulic pressure. Then, when injection is executed, the screw hold member is moved forward by rotating the screw shaft. Note that, the embodiment describes a case in which a hysteresis brake is used as the brake unit. Further, the embodiment describes that the shafts such as the screw and the screw shaft are connected to a servo motor that acts also as a rotating motor for applying a rotating force to the shafts through a gear and a drive belt, although this is an ordinary arrangement in conventional technologies.

Further, to control the molding material pressure of the screw, a molding material pressure detecting means such as a load cell, and the like is mounted on a member receiving a load due to the rearward movement of the screw, the molding material pressure is recognized as an absolute value in response to a signal output from the molding material pressure detecting means, and the axial movement of the screw is controlled based on the absolute value.

That is, the electric output signal output from the load cell is recognized as an absolute value showing a back pressure in metering and further recognized as an absolute value showing an injection pressure in injection as described above, and the axial pressures of the screw in the metering and the injection are controlled based on these absolute values, respectively. The electric signal output from the load cell is ordinarily amplified by an amplifier and passed through a low-pass filter for eliminating the electric disturbance thereof such as noise, and the like.

Note that since the back pressure is about 15% or less of the fill pressure of the injection pressure (ordinarily $\frac{1}{10}$ or less) and controlled in a very small value, the electric signal detecting the signal is liable to be influenced by the electric disturbance thereof. The holding pressure of the injection pressure may be as large as the back pressure. Further, when the moving position of the screw is controlled, greater emphasis is placed on control responsiveness in injection than in metering because an injection time is much shorter than a metering time. Further, when an electric signal is effectively used as a feed-back signal after noise is eliminated therefrom, the frequency band in which the feed-back signal can be used is different between a back pressure and an injection pressure produced in the screw.

Therefore, in general, the constant of a low-pass filter for eliminating the electric disturbance is set to a given value so as to provide a relatively high frequency band by placing emphasis on the control responsiveness in the injection, and the signal output from the low-pass filter is captured as a feed-back signal for controlling the axial movement of the screw in a frequency band in which the electric disturbance is eliminated by the given constant.

However, the technology disclosed in Japanese Examined Patent Application Publication No. 63-25934 among the above conventional technologies converts the rearward movement of the screw caused by the back pressure only in the metering into the rotating motion. Accordingly, a problem arises in that a small force such as the back pressure caused by the rearward movement of the screw in the metering cannot be effectively converted, the back pressure to be controlled is dispersed, and thus the back pressure in the metering cannot be accurately controlled. This is because the efficiency of the screw shaft for converting the rearward movement into the rotating motion is bad.

Further, in this technology, a problem arises in that the control responsiveness cannot be improved and the back pressure cannot be accurately controlled in the metering. This is because the position of the screw in the metering cannot help being controlled, so to speak, only indirectly by controlling the rotating force converted from the rearward movement of the screw simply by a brake.

Further, in the technology, in which the load cell is mounted on the member receiving the load applied by the rearward movement of the screw to detect the molding material pressure produced to the screw, of the conventional technologies described above, when the electric signal, from which the electric disturbance such as noise, and the like has been eliminated by the given constant, is captured as the feedback signal in the injection and metering, a problem arises in that the electric signal cannot be used as an effective control signal for controlling the axial movement of the screw in the injection and metering. This is because the magnitude, control responsiveness, and frequency band of the output electric signal are not proper in the injection and the metering.

Further, in this technology, the linearity between the received back pressure and the output signal of the load cell is bad and thus it is difficult to accurately control the back pressure of the screw. This is because that since the back pressure is ordinarily much smaller than the injection pressure as described above, the low pressure detecting region of the load cell is used.

Furthermore, in the technology in which the permanent magnet is used to drive the servo motor for controlling the axial movement of the screw, a problem arises in that the axial movement of the screw cannot be accurately controlled. This is because a cogging torque produced by the permanent magnet of the servo motor makes the torque of the screw shaft unstable and a pulsation is produced thereby. The influence caused by the above problems becomes serious particularly when the relatively small back pressure in the metering and the holding pressure after injection and filling of the molding material pressure are controlled.

In addition to the above problems, a problem is also arisen in that the dimension of the injection device is increased in the axial direction and a relatively large installation space is necessary, thereby the injection device cannot be made compact. This is because the rotating shaft of the rotating rotor of the screw rotating motor projects forward as described above. Then, there is a possibility that a problem is arisen in quietness in operation due to friction noise and gear mesh noise. This is because the gear and the drive belt are interposed between the screw rotating motor and the screw. Further, a problem is arisen in that it is difficult to improve controllability because there is a possibility that an error is caused in the rotation control of the screw by an increase in backlash, and the like due to wear.

An object of the present invention, which was made in view of the aforementioned problems, is to provide an injection molding machine and a method of controlling the injection molding machine capable of controlling the axial pressure of a screw by accurately detecting a molding material pressure received by the screw in the state in which bearings and ball screws of the injection molding machine are not influenced by wear, and the like. Further, an object of the present invention is to provide an injection molding machine that is compact in its entirety and excellent in the rotation controllability and the quietness of a screw.

DISCLOSURE OF INVENTION

To achieve the above objects, an invention according to a method of controlling an injection molding machine having a screw inserted into a heating cylinder so as to be rotated about its axis and moved along an axial direction is characterized in that a pre-pressure acting in the opposite direction of an axially rearward molding material pressure received by the screw is added to a detection means and/or the screw, the molding material pressure is detected by a detection means, and an axial pressure of the screw is controlled based on a difference between the pre-pressure and the molding material pressure.

To achieve the above objects, an invention according to a method of controlling the injection molding machine having a screw inserted into a heating cylinder so as to be rotated about its axis and moved along an axial direction is characterized in that an axially rearward molding material pressure received by the screw in injection and metering is detected and output as an electric signal, an electric disturbance of the electric signal is eliminated by switching a constant to a value different between the injection and the metering, and the electric signal from which the electric disturbance has been eliminated by the different constant is fed back and controlled.

Further, to achieve the above objects, an invention according to an injection molding machine having a screw inserted into a heating cylinder so as to be rotated about its axis and moved along an axial direction is characterized by including a detection means for detecting an axial pressure of the screw, a pre-pressure addition means for adding a pre-pressure acting in an opposite direction of a molding material pressure received by the screw to the detection means and/or the screw, and a screw axial direction pressure control means for controlling the axial pressure of the screw based on a difference between the pre-pressure and the molding material pressure.

To achieve the above objects, an invention according to an injection molding machine is characterized in that the pre-pressure addition means is made non-contact with the detection means.

To achieve the above objects, an invention of an injection molding machine having a screw inserted into a heating cylinder so as to be rotated about its axis and moved along an axial direction is characterized by including a detection means for detecting an axial pressure of the screw and outputting it as an electric signal, and a filter for eliminating an electric disturbance of the electric signal output from the detection means by a predetermined constant, wherein the constant of the filter for eliminating the electric disturbance can be switched between the injection and the metering.

To achieve the above objects, an invention according to an injection molding machine is characterized by including a screw rotating motor for rotating a screw inserted into a heating cylinder about its axis, and a screw movement means having an actuator for moving the screw axially rearward and forward, wherein the actuator of the screw movement means is disposed on the heating cylinder side and the rear end of the screw is coupled inside of the rotating output section of the screw rotating motor.

In the metering, the metering is executed while detecting the molding material pressure by the detection means in a state in which the pre-pressure acting in the opposite direction of the molding material pressure is previously added to the detection means and/or the screw by the pre-pressure addition means in a predetermined force according to a back pressure. The detection means detects only the pre-pressure at the beginning. However, when the back pressure is produced to the screw in the metering, the axial pressure detected by the detection means a relative difference between the back pressure and the pre-pressure because the pre-pressure is cancelled by the back pressure. In the metering, the back pressure of the screw is directly controlled by the screw axial direction pressure control means such that the relative difference of the axial pressure detected by the detection means is made to a predetermined value including zero.

In contrast, in the injection, the molding material pressure is detected by the detection means in a state in which the pre-pressure acting in the opposite direction of the molding material pressure is previously added to the detection means and/or the screw in a predetermined force according to an injection pressure, and the injection and filling are executed while directly controlling the injection pressure including a holding pressure in the injection by the screw axial direction pressure control means, similarly in the metering.

The molding material pressure can be stably and accurately controlled without being influenced by the detection region in which the detection means is used by directly controlling the axial pressure of the screw by the screw axial direction pressure control means based on the relative difference between the detected molding material pressure and the added pre-pressure.

Further, the load applied to the thrust bearing, and the like for supporting the screw in the axial direction is reduced by the pre-pressure previously added to the screw, and thus wear by friction is reduced, thereby the molding material pressure can be stably and accurately controlled. Then, the back pressure and the injection pressure of the screw can be determined, respectively by the value obtained by adding the previously added pre-pressure to the axial pressure detected by the detection means.

In the invention, the axially rearward molding material pressures received by the screw in the injection and metering are detected and output as the electric signals, and the electric disturbance of the electric signals is eliminated by passing the electric signals through the filter. Then, the constant of the filter for eliminating the electric disturbance is switched to a different proper value according to the injection and the metering. Thereafter, the detection signal from which the electric disturbance has been properly eliminated is fed back, thereby the axial movement of the screw is directly controlled.

In the invention, since the pre-pressure addition means is made non-contact with the detection means, the injection molding machine is not influenced by wear when the pre-pressure is added. Therefore, the life of the injection molding machine can be prevented from being shortened by wear.

In the invention, the axially rearward molding material pressures received by the screw in the injection and the metering are detected by the detection means and output as the electric signals, and the electric disturbance of the electric signals is eliminated by passing the electric signals through the filter. Then, since the constant of the filter for eliminating the electric disturbance of the filter can be switched to the different value in the injection and the metering, a proper value can be obtained in the injection and the metering. Thereafter, the detection signals from which the electric disturbance has been properly eliminated are fed back thereby the axial movement of the screw is directly controlled.

In the invention, since the actuator of the screw movement means does not interfere with the screw rotating motor to which the rear end of the screw is connected by disposing the actuator on the heating cylinder side, a relatively large screw rotating motor can be employed, thereby the screw rotating motor can be made compact in its axial direction.

Further, the rear end of the screw is spline-connected inside of the rotating output section of the screw rotating motor, thereby the screw rotating motor can be made more compact in its axial direction. Furthermore, since the screw can be directly driven in rotation without using a gear and a belt, the rotation of the screw can be accurately controlled as well as the quietness thereof is improved.

BEST MODE FOR CARRYING OUT THE INVENTION

Figure 2:
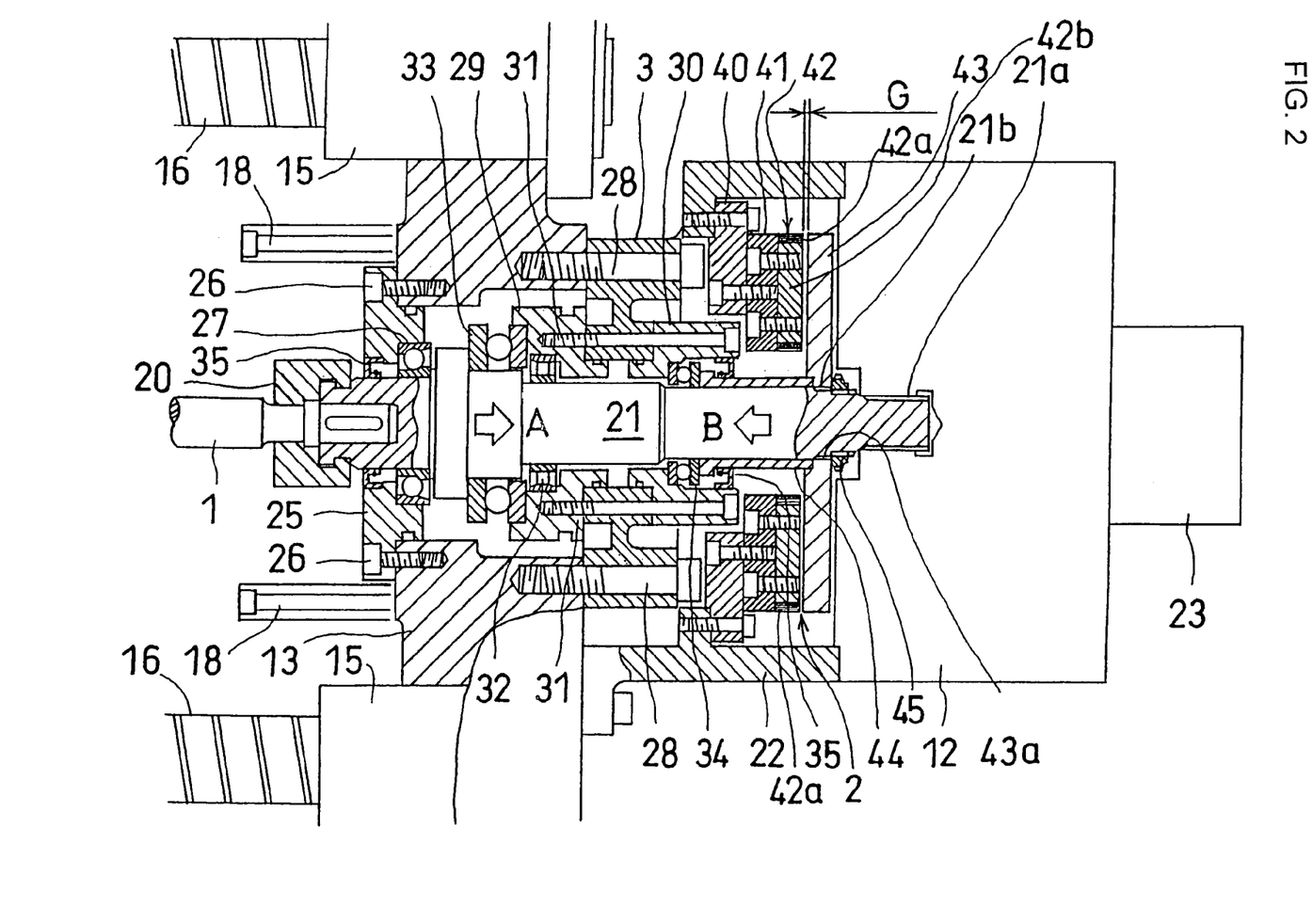
FIG. 2 is a sectional view showing an embodiment of a controlling device for the injection molding machine of the present invention.
Figure 3:
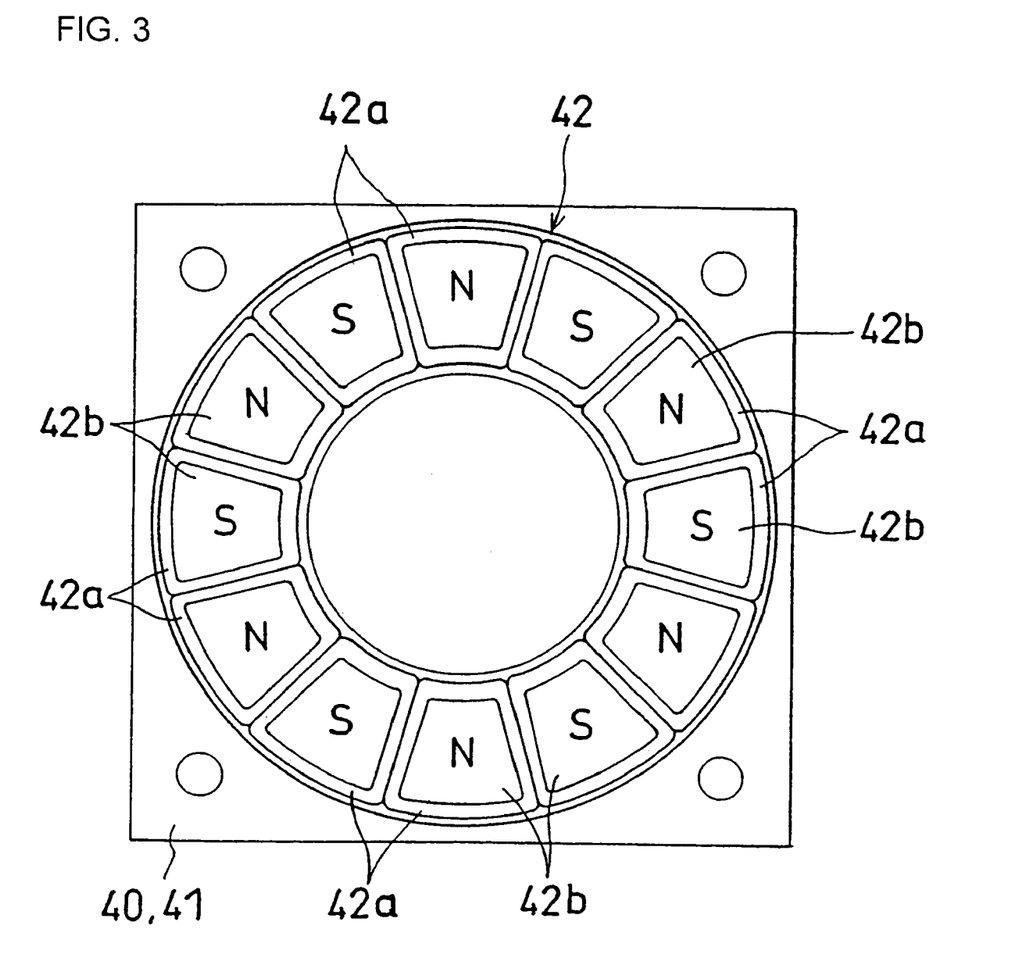
FIG. 3 is a front elevational view of an electromagnet constituting a pre-pressure addition device in the present invention.
Figure 4:
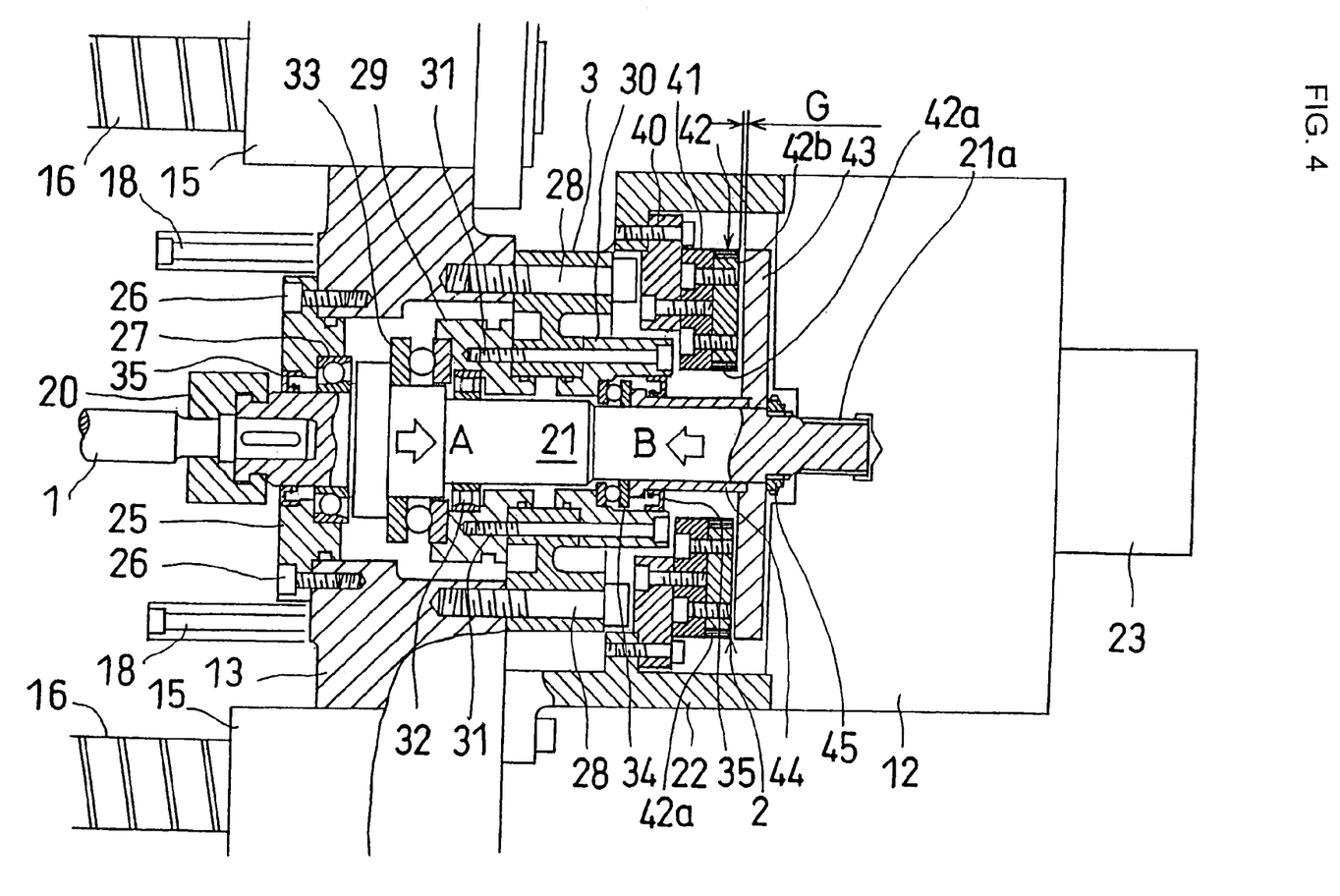
FIG. 4 is a sectional view showing another embodiment of the controlling device for the injection molding machine of the present invention different from that shown in FIG. 2.

First, an embodiment of an injection molding machine of the present invention will be described in detail based on FIGS. 1 to 7. Note that FIGS. 2 and 4 show different embodiments of the injection molding machine of the present invention in enlargement. In the following description, the same reference numerals denote the same or corresponding portions.

The injection molding machine of the present invention generally includes a pre-pressure addition means 2 for adding a pre-pressure (an arrow B in FIG. 2) acting in the opposite direction of a molding material pressure (an arrow A in FIG. 2) received by a screw 1 to a detection means 3 for detecting the axial pressure of the screw 1 and/or to the screw 1, the detection means 3 for detecting the axial pressure of the screw 1 (arrows A and B of FIG. 2), and a screw axial pressure control means 4 for controlling the axial pressure based on a difference between the pre-pressure B and the molding material pressure A, wherein the pre-pressure addition means 2 is made non-contact with the detection means 3.

Further, in the injection molding machine of the present invention in this embodiment, the detection means 3 detects the molding material pressure produced to the screw in injection and metering and outputs a detected result as an electric signal, in addition to the above arrangement. Thus, the injection molding machine includes a filter 51 (refer to FIG. 5) for eliminating the electric disturbance of the electric signal output from the detection means 3 by a predetermined constant, and the filter 51 can switch the constant for eliminating the electric disturbance between the injection and the metering.

Further, the injection molding machine of the present invention of this embodiment includes a screw rotating motor 12 for rotating the screw 1 inserted into a heating cylinder 10 about its axis and a screw movement means (to be described later) having forward and backward driving motors 17 acting as an actuator for moving the screw 1 axially rearward and forward. The forward and backward driving motors 17 of the screw movement means are disposed adjacent to the heating cylinder 10, and a rear end 21a of the screw 1 is coupled inside a rotor acting as the rotation output section of the screw rotating motor 12.

Here, the molding material pressure A includes a back pressure and an injection pressure that act to cause the screw 1 to be pushed axially rearward by the reaction of the molding material in the metering and the injection. Further, the axial pressure includes the molding material pressure A and the pre-pressure B added by the present invention. The term "pressure" used in them means a magnitude of force.

As shown in FIG. 1, the injection device of the injection molding machine includes the heating cylinder 10 having a nozzle 11 at the extreme end thereof, the screw 1 inserted into the heating cylinder 10, the screw rotating motor 12 connected to the rear end of the screw 1 and acting as a rotating drive means for rotating the screw 1 about its axis, a support base 13 disposed movably axially forward and backward of the screw 1 so as to support the screw rotating motor 12, and the screw axial pressure control means 4 for moving the support base 13 axially forward and rearward of the screw 1.

The screw axial pressure control means 4 in the embodiment includes ball screw nuts 15 disposed to both the ends of the support base 13, respectively, a pair of ball screws 16 with which the ball screw nuts 15 are threaded, respectively, and the forward and backward driving motors 17 for driving in rotation the ball screws 16 about their axes, respectively. The screw axial pressure control means 4 also acts as a screw movement means. Each of the forward and backward driving motors 17 is composed of a servo motor whose amount of drive in rotation can be numerically controlled and disposed adjacent to the heating cylinder 10 without interfering with the screw rotating motor 12. The rotation of the forward and backward driving motors 17 rotates the ball screws 16 about their axes, thereby the support base 13 to which the ball screw nuts 15 threaded with ball screws 16 are disposed is moved axially forward and rearward (right to left direction in FIGS. 1 and 2). As the support base 13 is moved axially forward and rearward, the screw rotating motor 12 supported by the support base 13 is also moved, thereby the axially forward and rearward movement of the screw 1 whose the rear end is connected to the screw rotating motor 12 is controlled. Note that a pair of stoppers 18 are disposed forward of the support base 13 so as to regulate the axially forward movement of the screw 1. Although not shown, each of the forward and backward driving motors 17 includes a rotary encoder for detecting the amount of rotation thereof.

As shown in FIG. 2, a screw connector 21 is connected to the rear end of the screw 1 through a coupling 20 so as not to relatively rotate. Involute spline teeth 21a are formed to the rear end of the screw connector 21. In contrast, the screw rotating motor 12 is composed of a servo motor whose amount of drive in rotation can be numerically controlled and mounted on a motor mounting housing 22 disposed to the support base 13. Then, internal teeth meshed with the involute spline teeth 21a of the screw connector 21 are formed inside of rotor (not shown) of the screw rotating motor 12 acting as the rotation output section thereof. Accordingly, the screw 1 is allowed to move along the axial direction relatively with respect to the screw rotating motor 12 mounted on the support base 13 through the motor mounting housing 22. A rotary encoder 23 is disposed to the rear end of the screw rotating motor 12 to detect the amount of rotation thereof. Since the forward and backward driving motors 17 are disposed adjacent to the heating cylinder 10 without interfering with the screw rotating motor 12, a screw rotating motor 12 that has a relatively large torque and a large diameter and is short in the axial direction can be employed here as the screw rotating motor 12. Further, the screw rotating motor 12 that is short in the axial direction can be employed because the spline 21a formed to the rear end of the screw connector 21 is meshed with the internal teeth spline formed in the rotating rotor of the screw rotating motor 12. As a result, the axial length of the overall injection molding machine can be shortened to thereby make the injection molding machine compact. Further, since the screw 1 is directly driven in rotation by the screw rotating motor 12 without through a gear and a belt as in the conventional technology, the rotation of the screw 1 about its axis can be accurately controlled, thereby quietness can be improved by suppressing noise produced in operation. Note that the screw rotating motor 12 may include a speed reduction mechanism (not shown). In this case, inner teeth are formed inside of the output shaft of the speed reduction mechanism acting as the rotation output section so as to be meshed with the involute spline teeth 21a of the screw connector 21.

A flange 25 is mounted on the front surface of the support base 13 through bolts 26, and a radial bearing 27 is attached to the flange 25 to rotatably support the screw connector 21. Further, the load cell 3 acting as a detection means is attached to the rear surface of the support base 13 to detect the molding material pressure A of the screw 1, and an adapter 29 is attached to the front surface of the load cell 3 such that a bearing plate 30 clamps the load cell 3 through bolts 31. A radial bearing 32 is disposed to the inner periphery of the adapter 29 to rotatably support the screw connector 21. Further, a thrust bearing 33 is attached to the front surface of the adapter 29 to support the screw connector 21 to which the screw 1 receiving the back pressure and the injection pressure is connected with respect to the axially rearward direction. In contrast, a thrust bearing 34 is disposed to the bearing plate 30 to receive the pre-pressure added thereto as described below. Further, seals 35 are disposed to the front surface of the radial bearing 27 of the flange 25 and to the rear surface of the thrust bearing 33 of the bearing plate 30, respectively. The space between the seals 35, 35 is filled with lubricating oil.

As shown in FIGS. 2 and 4, the pre-pressure addition means 2 for adding the pre-pressure B acting in the opposite direction of the molding material pressure A of the screw 1 is generally composed of an electromagnet 42 attached to the motor mounting housing 22 through attachment plates 40 and 41 and a movable rotating plate 43 attached to the screw connector 21 so as to face the electromagnet 42. As shown in FIG. 3, the electromagnet 42 is composed of a plurality of coils 42a disposed about an axis. The coils 42a are wound such that the polarities N and S of adjacent coils 42a are different from each other, and the cores 42b of the coils 42a are arranged by laminating special steel sheets (not shown) using silicon, and the like to prevent heating and a decrease in attracting force caused by an eddy current produced.

The movable rotating plate 43 is disposed in confrontation with the electromagnet 42 with a predetermined amount of gap G defined therebetween and acts so as to be attracted toward the electromagnet 42 when the respective coils 42 of the electromagnet are excited. In the embodiment shown in FIG. 2, a female screw 43a is formed around the inner periphery of the movable rotating plate 43 and threaded with a screw section 21b formed to the intermediate portion of the screw connector 21. Further, a lock nut 45 is threaded with the rear side surface of the movable rotating plate 43. Accordingly, the movable rotating plate 43 in the embodiment is integrated with the screw connector 21 without moving relatively along the axial direction with respect to the screw connector 21. Further, a spacer 44 is interposed between the front surface of the movable rotating plate 43 and the thrust bearing 34 attached to the bearing plate 30. The movable rotating plate 43 is rotated about an axis together with the screw connector 21, the spacer 44, and the like by driving the screw rotating motor 12. The axial length of the spacer 44 is set to maintain the gap G such that the movable rotating plate 43 can be sufficiently attracted toward the electromagnet 42 when the electromagnet 42 is exited and that the movable rotating plate 43 can be rotated about the axis together with the screw connector 21, and the like when the screw rotating motor 12 is driven.

In the embodiment arranged as described above, the movable rotating plate 43 is attracted toward the electromagnet 42 by exciting the electromagnet 42, and the pre-pressure B is previously added to the load cell 3 through the spacer 44, the thrust bearing 34, and the bearing plate 30 as well as the pre-pressure B acting in the opposite direction of the back pressure or the injection pressure A is added to the screw 1 by pushing the screw connector 21 integrated with the movable rotating plate 43 axially forward. The magnitude of the pre-pressure B is properly adjusted according to the holding pressure in the metering and injection and to the molding material pressure in the injection by controlling a current supplied to the electromagnet 42. In the embodiment, the screw connector 21 is also pushed forward together with the addition of the pre-pressure B. Thus, even if the back pressure or the holding pressure A is received by rotating the screw 1 about its axis by driving the screw rotating motor 12, a life can be greatly extended without being affected by the wear of the thrust bearing 33, and the like because the thrust bearing 33 is not subjected to an axially rearward load by the back pressure. Further, when the molding material is injected and the injection molding machine is filled with the molding material in an injection operation, since the pre-pressure B is added to oppose the injection pressure, the life can be greatly extended without being affected by the wear of the thrust bearing 33, and the like. Accordingly, it is possible to accurately control the screw by stabilizing the axial pressure thereof.

Next, the injection molding machine of the present invention will be described with reference to another embodiment based on FIG. 4. Note that portions similar or corresponding to the portions of the embodiment (FIG. 2) arranged as described above are denoted by the same reference numerals and the description thereof is omitted.

In this embodiment, the movable rotating plate 43 is not integrated with the screw connector 21 and can slide and move relatively axially with respect to the screw connector 21. Accordingly, in the embodiment shown in FIG. 4, the movable rotating plate 43 slides with respect to the screw connector 21 and is attracted toward the electromagnet 42 by exciting the electromagnet 42, thereby the pre-pressure B acting in the opposite direction of the back pressure or the injection pressure of the screw 1 is previously and directly added to the load cell 3 through the spacer 44, the thrust bearing 34, and the bearing plate 30.

Note that when the pre-pressure addition means 2 is composed of the electromagnet 42 and the movable rotating plate 43 acting so as to be attracted toward it in the present invention, the gap G is defined therebetween, and the electromagnet 42 for adding the pre-pressure B by acting to attract the movable rotating plate 43 is made non-contact with the movable rotating plate 43 for pushing the spacer 44 to transmit the pre-pressure B to the load cell 3. Thus, no wear is caused when the pre-pressure B is added to the load cell 3, thereby no rotating torque loss, and the like are produced to the screw rotating motor 12. However, the present invention is by no means limited to the above-mentioned embodiment and any other means such as a fluid pressure cylinder, and the like may be employed as long as they can add the pre-pressure B acting in the opposite direction of the molding material pressure A of the screw 1 to the load cell 3 and/or the screw 1. Further, when the fluid pressure cylinder is used, it is possible to measure the pre-pressure by detecting a fluid pressure.

Further, the present invention is by no mans limited to the embodiment and may be arranged to add the pre-pressure B only to the screw 1 through the screw connector 21. In this case, a bias force is added to the load cell 3 to push it in a direction opposing the pre-pressure B (that is, the same direction as the axial pressure A), the state in which the bias force is applied is set as the point of origin of the load cell 3, and the pre-pressure B is added so as to reduce the bias force to the load cell 3 by pushing the screw connector 21 axially forward by the movable rotating plate 43.

Further, although not shown, the present invention may be arranged to detect the molding material pressure A and the pre-pressure B by different detecting means such as load cells in place of the arrangement in which both the molding material pressure A and the pre-pressure B are detected by the single load cell 3.

As described also in Background Art, in the injection molding machine of the present invention, when the screw 1 is rotated about its axis through the screw connector 21 by driving the screw rotating motor 12 in a state in which the forward and backward driving motors 17 of the screw axial pressure control means 4 are stopped and locked or in a state in which a predetermined braking torque is added such that the screw 1 does not move in the axial direction in the metering, the back pressure A is produced to the screw 1 by the reaction caused when a molding resin is fed forward of the heating cylinder 10 and stored. Further, when the screw 1 connected to the screw rotating motor 12 of the support base 13 is moved forward in the injection by driving the forward and backward driving motors 17 of the screw axial pressure control means 4, the injection pressure A is produced to the screw 1 by the reaction caused when the molding resin is injected.

Figure 5:
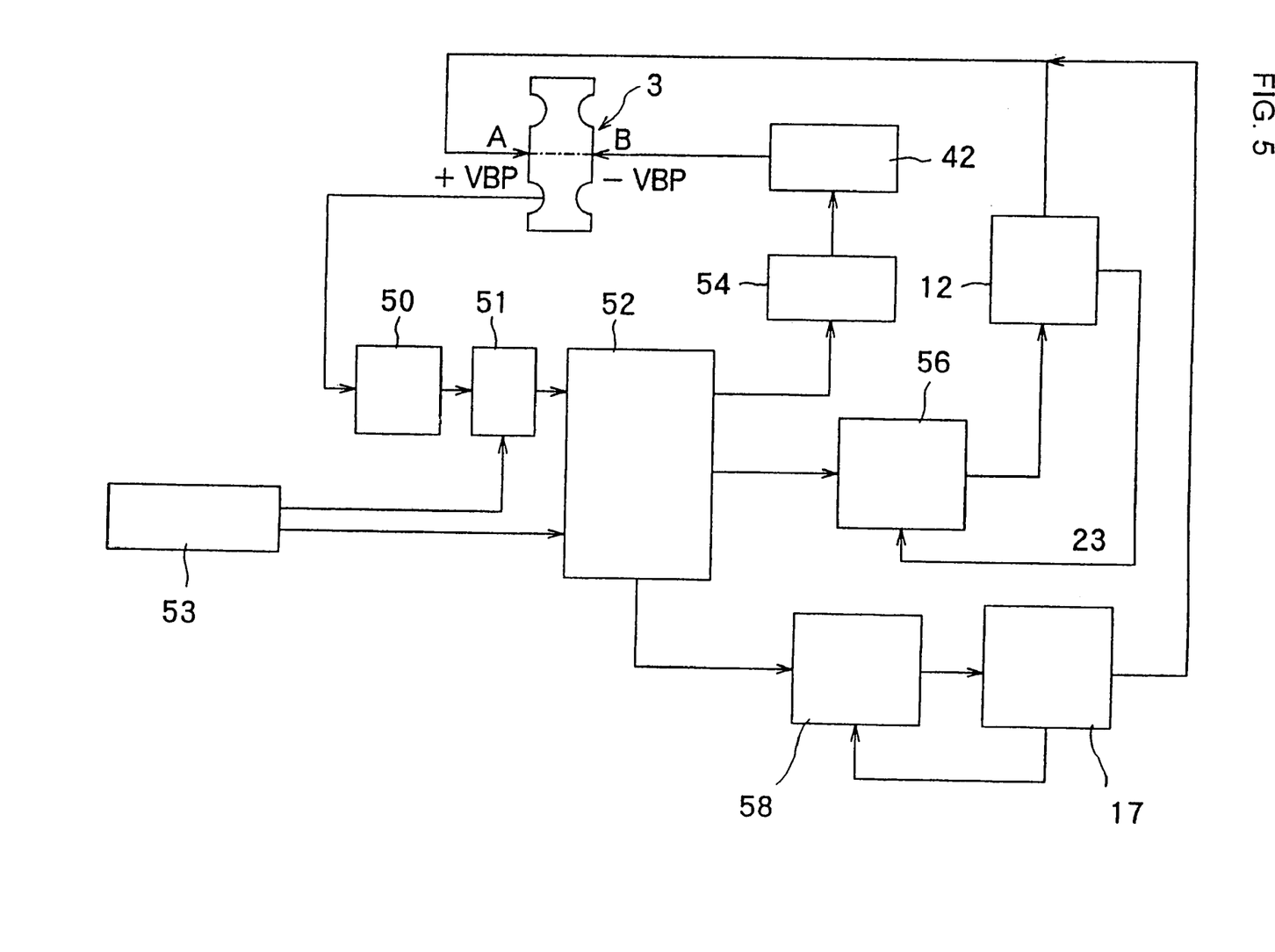
FIG. 5 is a block diagram showing schematically showing the contents of control of the controlling device for the injection molding machine of the present invention.
Figure 6:
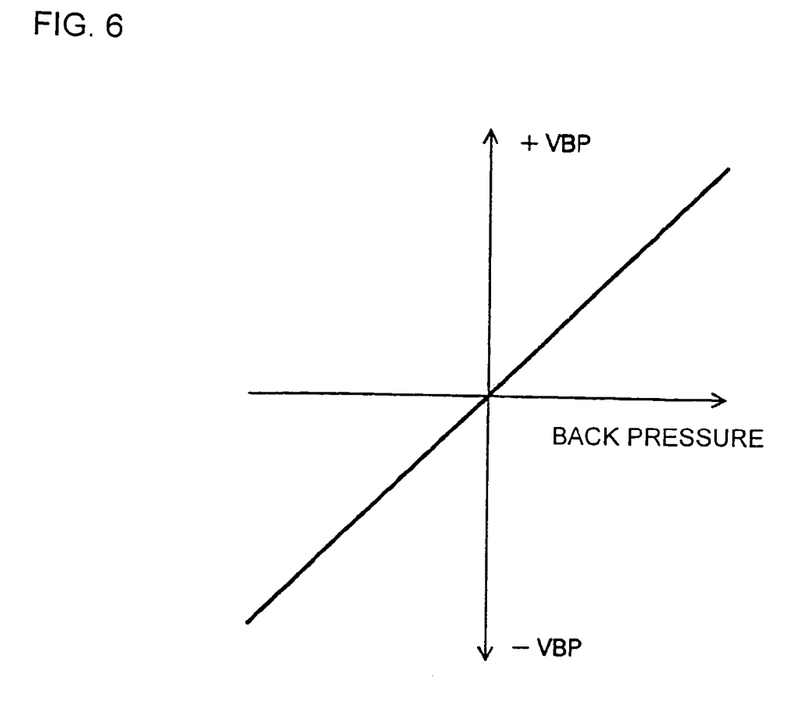
FIG. 6 is a graph explaining the relationship between the axial pressure of a screw detected by a detection means in the present invention and an added pre-pressure.

In the injection molding machine of the present invention, these back pressure and injection pressure, that is, the molding material pressure A is transmitted from the screw 1 to the load cell 3 through the screw connector 21, the thrust bearing 33, and the adapter 29. Then, a result of detection of an axial pressure showing a difference between the molding material pressure A detected by the load cell 3 and the previously added pre-pressure B is output as an electric signal. As shown in FIG. 5, the output (detection signal of the axial pressure is amplified by a load cell amplifier 50 and output to an arithmetic operation unit 52 through the filter 51 for eliminating electric disturbance such as noise, and the like.

Figure 7:
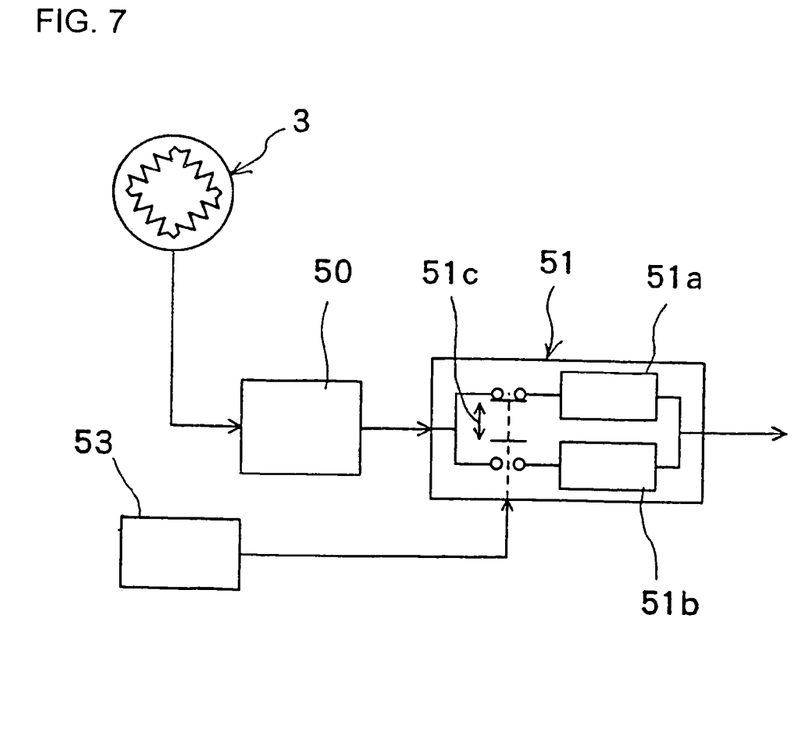
FIG. 7 is a block diagram explaining an arrangement in which an electric signal output from the detection means of the present invention can be switched between injection and metering.

The magnitude of force of the back pressure detected by the load cell 3 in the metering is greatly different from that of the injection pressure detected thereby in the injection. That is, the back pressure in the metering is ordinarily a value of 15% or less of the injection pressure in the injection, and the signal detecting the back pressure is liable to be affected by electric disturbance. Further, higher (more prompt) control responsiveness is required in the injection than in the metering in the axial movement of the screw 1. Thus, as shown in FIG. 7, a controller of the present invention is arranged such that a filter 51a is connected in parallel with a filter 51b as well as a switch 51c for switching both the filters 51a and 51b between the injection and the metering is disposed after the detection signal having been output from the load cell 3 is amplified by the load cell amplifier 50. In the above arrangement, the filter 51a has an optimum constant set thereto to eliminate the electric disturbance such as the noise, and the like in the injection, and the filter 51b has an optimum constant set thereto to eliminate the electric disturbance such as the noise, and the like in the metering. The switch 51c can be automatically actuated between the injection and the metering in response to a command from a control unit 53 which will be described later. For example, the constant of the filter 51a for eliminating the noise, and the like in the injection can be set within the range of 100 to 500 Hz, whereas the constant of the filter 51b for eliminating the noise, and the like in the metering can be set within the range of 10 to 50 Hz.

As shown in FIG. 5, the detection signal from which the electric disturbance such as the noise, and the like is eliminated by a proper constant through the load cell amplifier 50 and the filter 51 is sent to the arithmetic operation unit 52. The arithmetic operation unit 52 adjusts the current supplied to the electromagnet 42 of the pre-pressure addition means 4 through a pre-pressure amplifier 54 based on the values set to the injection pressure and the back pressure in the injection and the metering that act as references sent from the control unit 53, controls the current supplied to the screw rotating motor 12 that is set to rotate at a predetermined speed through a screw rotating motor amplifier 56, and controls the current supplied to the forward and backward driving motors 17 of the screw axial pressure control means 4 through a motor amplifier 58. The actual rotation of the screw rotating motor 12 is detected by the rotary encoder 23, and the rotations of the forward and backward driving motors 17 of the screw axial pressure control means 4 are also detected by rotary encoders (not shown) in the same way. These rotations are fed back to the screw rotating motor amplifier 56 and the motor amplifier 58, respectively as control signals effective to directly control the axial movement of the screw 1 such as the rotation of the screw 1 and the axially rearward movement position, the moving pressure, the moving speed, and the like of the screw 1 that affect the back pressure as the axial pressure of the screw 1 in the metering.

Next, a method of controlling the injection molding machine of the present invention will be described in detail as to a case in which the machine described above is used mainly based on FIGS. 5 and 6.

The method of controlling the injection molding machine of the present invention is generally such that the pre-pressure B acting in the opposite direction of the axially rearward molding material pressure A received by the screw 1 is added to the detection means 3 for detecting the axial pressure of the screw 1 and/or the screw 1, the molding material pressure A is detected by the detection means 3, and a difference between the pre-pressure B and the molding material pressure A is controlled to have a predetermined value.

Further, the method of controlling the injection molding machine of the present invention is such that the injection pressure in the injection and the back pressure in the metering that are received by the screw 1 are detected and output as electric signals, the electric disturbance of the electric signals is eliminated by switching the constant to a different value between the injection and the metering, and the control is executed by feeding back the electric signals from which the electric disturbance has been eliminated by the different constants.

First, the screw 1 is located at a forward movement limit position in the heating cylinder 10 on the completion of injection (accordingly, the support base 13 having the ball screw nuts 15 threaded with the ball screws 16 is located at a left position in FIG. 1), and the screw rotating motor 12 stops. The movable rotating plate 43 is attracted from this state by exiting the electromagnet 42 by supplying a current of a predetermined value thereto, and the given pre-pressure B, which has a value approximately the same as the back pressure A (that is, in equilibrium with the back pressure B) in the embodiment according to the back pressure A in the metering is previously added to the load cell 3 and/or the screw connector 21. The pre-pressure B is detected by the load cell 3. Then, it can be determined whether or not an error is made in the gap G set to a predetermined amount between the electromagnet 42 and the movable rotating plate 43 from the relationship between the current of the predetermined value supplied to the electromagnet 42 and the pre-pressure detected by the load cell 3. When the error is made in the gap G, the value of the current supplied to the electromagnet 42 or the electric signal output from the load cell 3 can be corrected. Note that, at this time, the switch 51c is switched by the control unit 53 such that the electric signal is output to the filter 51b, which is set to a constant optimum in the metering, of the filter 51.

When the screw rotating motor 12 is drive in rotation at a predetermined speed in this state, the screw 1 is rotated about its axis through the screw connector 21, and the molding material in the heating cylinder 10 is fed forward and begins to be metered. At this time, the back pressure A is produced to the screw 1 by the reaction caused by the molding material fed forward, thereby the screw connector 21 to which the rear end of the screw 1 is connected is pushed axially rearward thereof so as to oppose the pre-pressure B. Then, a difference between the pre-pressure B added in a given force and the back pressure A produced by driving the screw rotating motor 12 is detected by the load cell 3. In the present invention, the forward and backward driving motors 17 of the screw axial pressure control means 4 are directly controlled to brake, stop or move forward them in order to make the value of the axial pressure detected by the load cell 3 to zero, that is, in order to cause the pre-pressure B to be in equilibrium with the back pressure A. This is executed in such a manner that when the back pressure A produced to the screw 1 is equal to or greater than the pre-pressure B (+VBP in FIG. 6), the back pressure A is reduced by positively moving the position of the screw 1 axially rearward by driving the forward and backward driving motors 17 of the screw axial pressure control means 4, whereas when the back pressure A produced to the screw 1 is less than the pre-pressure B (−VBP in FIG. 6), the position of the screw 1 is stopped in the axial direction or positively moved forward by driving the forward and backward driving motors 17 of the screw axial pressure control means 4. Since the pre-pressure B is added in a pressure (force) approximately similar to the back pressure A or in a predetermined arbitrary pressure (force), the actual back pressure A produced by driving the screw rotating motor 12 can be easily detected by the difference (relative value) of it to the pre-pressure B output from the load cell 3. Then, since the forward and backward driving motors 17 of the screw axial pressure control means 4 are directly controlled based on the difference between the actual back pressure A detected by the load cell 3 and the pre-pressure B in place of that they are controlled based on the absolute value of only the back pressure A detected by the load cell 3 as in the conventional technology, the axial pressure of the screw 1 can be accurately and stably controlled with excellent responsiveness without being influenced by the magnitude, control responsiveness and frequency band of the electric signal output from the load cell 3.

Further, in the present invention, the axial pressure produced by the forward and backward driving motors 17 is directly controlled different from the conventional technology in which the screw 1 is moved rearward following to the restriction imposed on the rotating torque, which is caused by the produced back pressure A, of the forward and backward driving motors 17. Accordingly, the pulsation of the forward and backward driving motors 17 due to a cogging torque is eliminated when the ball screws 16 are rotated about their axes to control the axial movement of the screw 1, thereby the axial movement of the screw 1 can be more accurately controlled.

In contrast, when the metering has been finished and the molding material stored forward of the heating cylinder 10 is injected from the nozzle 1 for filling, the screw 1 rotated about its axis by the screw rotating motor 12 is stopped. Then, the switch 51c is automatically actuated by the control unit 53 to output the electric signal to the filter 51a, which is set to a constant optimum in the injection, of the filter 51. Further, the electromagnet 42 is exited by supplying the current of the predetermined value thereto according to the pre-pressure B in the opposite direction so that the movable rotating plate 43 is attracted thereby in order to previously add the pre-pressure B in the opposite direction in an arbitrary constant pressure (force) to the screw connector 21 and the load cell 3 to oppose the injection pressure in this embodiment. With this operation, the axial forward movement pressure of the screw 1 that influences the injection pressure in the injection is controlled. When the support base 13 having the ball screw nuts 15 threaded with the ball screws 16 is directly controlled such that it is moved forward with a predetermined pressure by driving in rotation the forward and backward driving motors 17 of the screw axial pressure control means 4 with a predetermined torque in this state, the screw 1 connected to the screw rotating motor 12 supported by the support base 13 through the screw connector 21 is moved forward in the heating cylinder 10 with a predetermined pressure, thereby the molding material is injected from the nozzle 11 with a predetermined injection pressure for filling. At this time, the screw 1 receives the reaction of the molding material injected from the screw 1, and the injection pressure A is produced to the screw 1 and supported by the thrust bearing 33, and the like. However, since the pre-pressure B is previously added to the screw 1, the thrust bearing 33 is controlled such that the axial load thereof is reduced by a difference between the pre-pressure B and the injection pressure A, and the wear of the thrust bearing 33, and the like is reduced, thereby the molding material pressure can be accurately and stably controlled. Further, the electric disturbance such as noise, and the like of the signal of the injection pressure A output from the load cell 3 having detected the actual back pressure A up to that time is properly eliminated by the filter 51a, thereby the injection pressure of the screw 1 can be controlled with prompt responsiveness by the output signal in a relatively high frequency band.

Further, when the screw 1 is maintained with a predetermined pressure after the completion of the injection and filling of the molding material in the injection, the holding pressure is ordinarily lower than the fill pressure and may be as large as the back pressure in the metering. In this case, the screw 1 is pushed so as to be moved axially forward by driving the forward and backward driving motors 17 of the screw axial pressure control means 4 in a state in which the pre-pressure B according to the holding pressure is added to the load cell 3, similarly to the back pressure control in the metering, thereby the forward and backward driving motors 17 are directly controlled based on a difference between the pre-pressure B detected by the load cell 3 and the molding material pressure A due to the holding pressure such that the difference is made to a predetermined value including zero.

As described above, the accuracy and responsiveness when the movement of the screw is controlled can be improved in the present invention because the axial pressure of the screw is directly controlled in the metering and injection and further controlled based on the detected value that is relative with respect to the molding material pressure by previously adding the predetermined pre-pressure.

INDUSTRIAL APPLICABILITY

According to the invention, a method of controlling an injection molding machine can be provided which can directly and properly control the axial pressure of the screw by accurately detecting the molding material pressure received by the screw in such a manner that the pre-pressure acting in the opposite direction of the axially rearward molding material pressure received by the screw is added to the detection means and/or the screw, the molding material pressure is detected by the detection means, and the axial pressure is controlled based on a difference between the pre-pressure and the molding material pressure.

According to the invention, a method of controlling the injection molding machine can be provided which can properly control the axial movement of the screw according to the operating state of the injection molding machine by accurately detecting the molding material pressure received by the screw in such a manner that the axially rearward molding material pressure received by the screw in the injection and the metering is detected and output as an electric signal, the electric disturbance of the electric signal is eliminated by switching a constant to a value different between the injection and the metering, and the electric signal from which the electric disturbance has been eliminated is fed back and controlled.

Further, according to the invention, there can be provided an injection molding machine having a screw inserted into a heating cylinder so as to rotate about its axis and move along an axial direction, wherein a controlling device of the injection molding machine includes a detection means for detecting the axial pressure of the screw, a pre-pressure addition means for adding a pre-pressure acting in the opposite direction of the molding material pressure received by the screw to the detection means and/or the screw, and a screw axial pressure control means for controlling the axial movement of the screw such that a difference between the pre-pressure and the molding material pressure is made to a predetermined value. With this arrangement, the injection molding machine can properly control the axial pressure of the screw by accurately detecting the molding material pressure received by the screw because the screw axial pressure control means directly controls the axial pressure of the screw based on the relative difference detected between the molding material pressure and the pre-pressure.

According to the invention, there can be provided an injection molding machine that is not influenced by wear when the pre-pressure is added thereto and that can prevent the life of the machine from being shortened by the wear because the pre-pressure addition means is made non-contact with the detection means.

According to the invention, there can be provided a injection molding machine capable of properly controlling the axial pressure of a screw by accurately detecting the molding material pressure received by the screw because the injection molding machine includes a detection means for detecting the axial pressure of the screw and outputting it as an electric signal and a filter for eliminating the electric disturbance of the electric signal output from the detection means by a predetermined constant, and the constant of the filter for eliminating the electric disturbance can be switched between the injection and the metering.

According to the invention, there can be provided an injection molding machine including a screw rotating motor for rotating a screw inserted into a heating cylinder about its axis and a screw movement means having an actuator for moving the screw axially rearward and forward, wherein the injection molding machine is arranged compact in its entirety because the actuator of the screw movement means is disposed on the heating cylinder side and the rear end of the screw is coupled inside of the rotating output section of the screw rotating motor as well as the screw has excellent rotation controllability and quietness because it is directly driven in rotation without using a gear and a belt.

The invention claimed is:

1. A method of controlling an injection molding machine comprising:
    a heating cylinder;
    a screw inserted into the heating cylinder;
    a screw rotating motor for rotating the screw about its axis; and
    a screw movement means having an actuator for moving the screw axially rearward and forward, wherein
    an axially rearward molding material pressure received by the screw is detected by a detection means,
    a pre-pressure acting in the opposite direction of the molding material pressure is previously added to the screw by a pre-pressure addition means comprising an electromagnet, and
    an axial pressure of the screw by the screw movement means is controlled in such a manner that a difference between the pre-pressure and the molding material pressure becomes zero.

2. A method of controlling an injection molding machine comprising:
    a heating cylinder;
    a screw inserted into the heating cylinder;
    a screw rotating motor for rotating the screw about its axis; and
    a screw movement means having an actuator for moving the screw axially rearward and forward, wherein
    an axially rearward molding material pressure received by the screw in injection and metering is detected and output as an electric signal,
    filters for eliminating electric disturbance of the electric signal are provided, the filters being automatically switched and having a constant different from each other; and
    the electric disturbance of the electric signal is eliminated through a filter having a larger constant in the injection, and the electric disturbance of the electric signal is eliminated through a filter having a smaller constant in the metering, and
    the electric signal from which the electric disturbance has been eliminated through the filters having different constants is fed back and an axial pressure of the screw by the screw movement means is controlled.

3. An injection molding machine comprising:
    a heating cylinder;
    a screw inserted into the heating cylinder;
    a screw rotating motor for rotating the about its axis; and
    a screw movement means having an actuator for moving the screw axially rearward and forward, wherein
    a detection means for detecting an axial pressure received of the screw,
    a pre-pressure addition means comprising an electromagnet for previously adding to the screw a pre-pressure acting in the opposite direction of an axially rearward molding material pressure received by the screw, and
    a screw axial pressure control means for controlling an axial pressure of the screw in such a manner that a difference between the pre-pressure and the molding material pressure becomes zero.

4. An injection molding machine according to claim 3, wherein the pre-pressure addition means comprises an electromagnet and a movable rotating plate, the movable rotating plate is faced to the electromagnet and attached to a screw connector between the screw and the screw rotating motor, and made non-contact with the detection means.

5. An injection molding machine comprising:
    a heating cylinder;
    a screw inserted into the heating cylinder;
    a screw rotating motor for rotating the screw about its axis; and
    a screw movement means having an actuator for moving the screw axially rearward and forward, wherein
    a detection means for detecting an axial pressure of the screw and outputting it as an electric signal, and
    filters for eliminating an electric disturbance of the electric signal by detection means, the filters being automatically switched and having a constant different from each other, and
    the electric disturbance of the electric signal is eliminated through a filter having a larger constant in the injection, and the electric disturbance of the electric signal is eliminated through a filter having a smaller constant in the metering.

* * * * *

UNITED STATES PATENT AND TRADEMARK OFFICE
CERTIFICATE OF CORRECTION

PATENT NO. : 7,150,841 B2 Page 1 of 1
APPLICATION NO. : 11/044019
DATED : December 19, 2006
INVENTOR(S) : Morita et al.

It is certified that error appears in the above-identified patent and that said Letters Patent is hereby corrected as shown below:

Column 16, Line 28,
Please delete " the about " and
replace with -- the screw about --

Column 16, Line 57,
Please delete " by detection " and
replace with -- by a detection --

Signed and Sealed this

Thirteenth Day of March, 2007

JON W. DUDAS
*Director of the United States Patent and Trademark Office*